United States Patent
Kumbalimutt et al.

(10) Patent No.: US 7,266,594 B2
(45) Date of Patent: Sep. 4, 2007

(54) METHOD AND SYSTEM FOR CONFIGURING A COMPUTER FOR REAL-TIME COMMUNICATION

(75) Inventors: Vishwajith Kumbalimutt, Redmond, WA (US); Robert John Osborne, Redmond, WA (US); Robert Brown, Kirkland, WA (US); David J. Simons, Redmond, WA (US); Jeremy T. Buch, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 657 days.

(21) Appl. No.: 10/045,745

(22) Filed: Nov. 7, 2001

(65) Prior Publication Data

US 2003/0101247 A1 May 29, 2003

(51) Int. Cl.
*G06F 15/177* (2006.01)
(52) U.S. Cl. .................................. 709/221; 709/204
(58) Field of Classification Search ........ 709/220–222, 709/204, 205
See application file for complete search history.

(56) References Cited

U.S. PATENT DOCUMENTS

| | | | | |
|---|---|---|---|---|
| 5,832,503 A * | 11/1998 | Malik et al. | ................. | 709/222 |
| 6,012,088 A * | 1/2000 | Li et al. | ................. | 709/220 |
| 6,026,438 A * | 2/2000 | Piazza et al. | ................. | 709/221 |
| 6,343,313 B1 * | 1/2002 | Salesky et al. | ................. | 709/204 |
| 6,363,421 B2 * | 3/2002 | Barker et al. | ................. | 709/223 |
| 6,370,141 B1 * | 4/2002 | Giordano et al. | ................. | 709/221 |
| 6,484,315 B1 * | 11/2002 | Ziese | ................. | 709/221 |
| 6,557,054 B2 * | 4/2003 | Reisman | ................. | 709/221 |
| 6,560,704 B2 * | 5/2003 | Dieterman et al. | ................. | 709/221 |
| 6,598,075 B1 * | 7/2003 | Ogdon et al. | ................. | 709/204 |
| 6,829,638 B1 * | 12/2004 | McBrearty et al. | ................. | 709/219 |
| 6,856,616 B1 * | 2/2005 | Schuster et al. | ................. | 370/352 |
| 6,938,079 B1 * | 8/2005 | Anderson et al. | ................. | 709/222 |
| 6,963,897 B1 * | 11/2005 | Hubbard | ................. | 709/205 |
| 6,973,488 B1 * | 12/2005 | Yavatkar et al. | ................. | 709/223 |
| 7,007,080 B2 * | 2/2006 | Wilson | ................. | 709/221 |
| 7,023,989 B1 * | 4/2006 | Turner et al. | ................. | 709/220 |
| 7,093,006 B2 * | 8/2006 | Sanjeev et al. | ................. | 709/220 |
| 7,152,093 B2 * | 12/2006 | Ludwig et al. | ................. | 709/204 |
| 7,206,809 B2 * | 4/2007 | Ludwig et al. | ................. | 709/204 |
| 2002/0178241 A1 * | 11/2002 | Eriksson | ................. | 709/222 |
| 2003/0061315 A1 * | 3/2003 | Jin | ................. | 709/220 |
| 2003/0110240 A1 * | 6/2003 | Lockridge et al. | ................. | 709/220 |
| 2004/0015572 A1 * | 1/2004 | Kang | ................. | 709/220 |

OTHER PUBLICATIONS

Handley et al., "RFC 2543, SIP: Session Iniation Protocol," www.ietf.org, Mar. 1999, pp. 1-105.*
Rosenberg et al., "An XML Format for Presence Buddy Lists," Internet Draft, www.ietf.org, Jun. 2000, pp. 1-9.*

(Continued)

*Primary Examiner*—Bunjob Jaroenchonwanit
*Assistant Examiner*—Victor Lesniewski
(74) *Attorney, Agent, or Firm*—Perkins Coie LLP

(57) ABSTRACT

A method and system for configuring a client computer for real-time communication is provided, in which configuration settings are sent to the computer in the form of a configuration document, such as mark-up language document, that is readable by the client computer. The client computer may request the configuration document on an as-needed basis, or may request to be notified whenever new configuration settings are needed.

19 Claims, 11 Drawing Sheets

OTHER PUBLICATIONS

Rosenberg et al., "SIP Extensions for Presence Authorization," Internet Draft, www.ietf.org, Jun. 2000, pp. 1-10.*

Staudt, Martin; Jarke, Matthias; Quix, Christoph, "Active Change Notification in Advanced Knowledge Base Servers," Proceedings of the Eighth IEEE International Conference on Tools with Artificial Intelligence, IEEE, Nov. 16-19, 1996, pp. 96-99.*

Hodes, Todd D.; Katz, Randy H., "Composable Ad Hoc Location-Based Services for Heterogeneous Mobile Clients," Wireless Networks, Kluwer Academic Publishers, Oct. 1999, vol. 5, Issue 5, pp. 411-427.*

Chakravorty, Rajiv; Ottevanger, Hans, "Architecture and Implementation of a Remote Management Framework for Dynamically Reconfigurable Devices," 10th IEEE International Conference on Networks, IEEE, Aug. 27-30, 2002, pp. 375-380.*

Adam Roach, *Automatic Call Back Service in SIP*, Internet Engineering Task Force, Internet Draft, pp. 1-7, (Mar. 2000).

Adam Roach, *Event Notification in SIP*, Internet Engineering Task Force, Internet Draft, Ericsson Inc., pp. 1-17, (May 2001).

Rosenberg et al., *An XML Format for Presence Buddy Lists*, Internet Engineering Task Force:Internet Draft, pp. 1-9, (Jun. 2000).

Rosenberg et al., *An XML Format for Watcher Information,*, Internet Engineering Task Force:Internet Draft, pp. 1-8, (Jun. 2000).

Rosenberg et al., *A Lightweight Presence Information Format (LPIDF)*, Internet Engineering Task Force:Internet Draft, pp. 1-7, (Jun. 2000).

Rosenberg et al., *A Data Format for Presence Using XML*, Internet Engineering Task Force:Internet Draft, pp. 1-14, (Jun. 2000).

Rosenberg et al., *SIP Extensions for Presence Authorization*, Internet Engineering Task Force:Internet Draft, pp. 1-10, (Jun. 2000).

Rosenberg et al., *SIP Extensions for Instant Messaging*, Internet Engineering Task Force:Internet Draft, pp. 1-9, (Feb. 2001).

Mahy et al., *SIP Extensions for Message Waiting Indication*, Internet Engineering Task Force:Internet Draft, pp. 1-19, (Jul. 2000).

Moyer et al., *Framework Draft for Networked Appliances using the Session Initiation Protocol*, Internet Engineering Task Force:Internet Draft, pp. 1-31, (Nov. 2000).

Handley et al., *SIP: Session Initiation Protocol*, Internet RFC/STD/FYI/BCP Archives, pp. 1-105 (Mar. 1999).

Rosenberg, *A SIP Event Sub-Package for Watcher Information*, Internet Engineering Task Force:Internet Draft, pp. 1-11 (Jul. 2001).

Roach, Adam, *SIP-Specific Event Notification*, Internet Engineering Task Force:Internet Draft, pp. 1-30 (Jul. 2001).

* cited by examiner

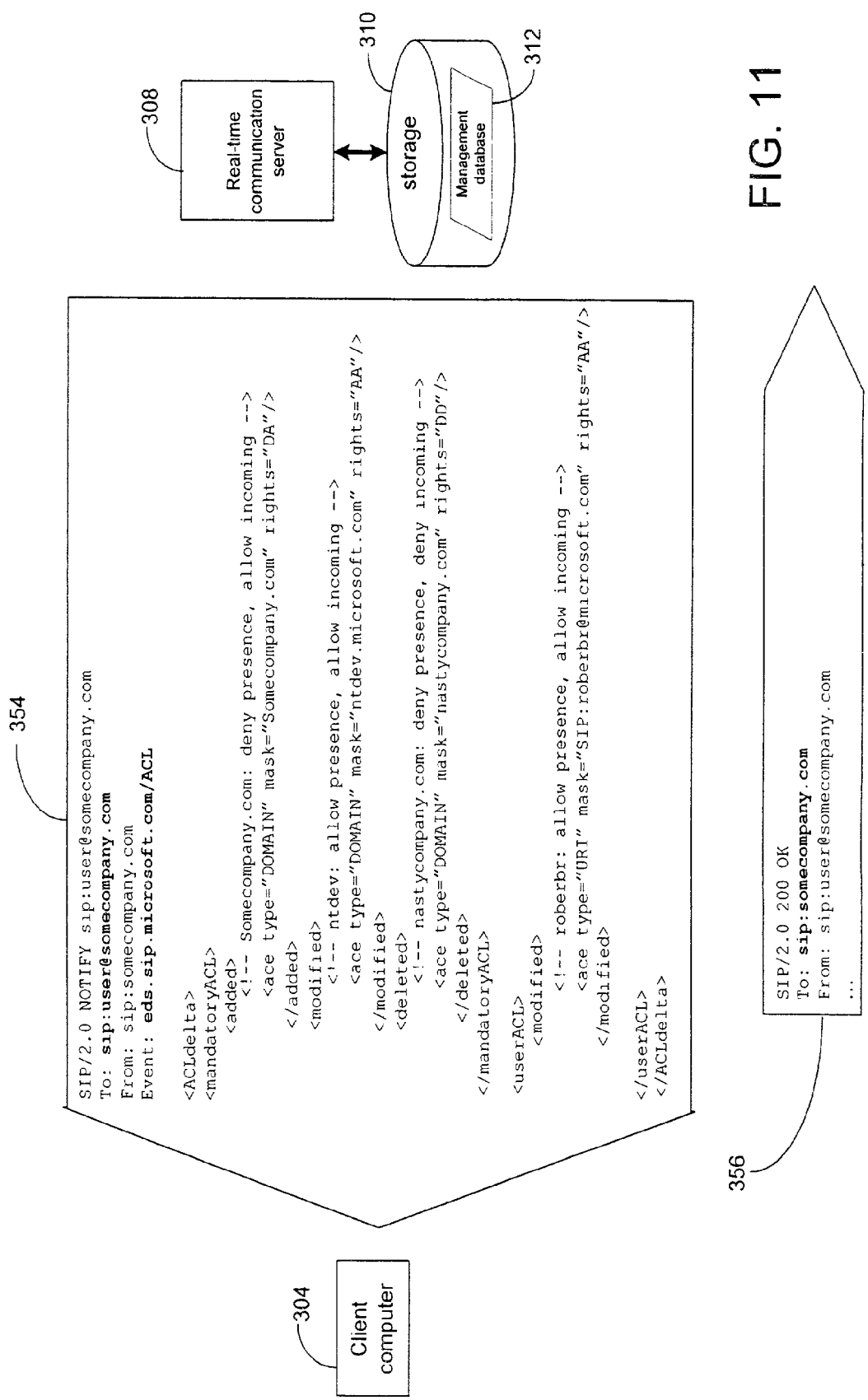

METHOD AND SYSTEM FOR CONFIGURING A COMPUTER FOR REAL-TIME COMMUNICATION

TECHNICAL FIELD OF THE INVENTION

The invention relates generally to real-time communication among computers and, more particularly, to providing real-time communication configuration data to client computers over a network.

BACKGROUND

With the increased availability of high bandwidth network connections in both enterprise settings and home settings, there has been an increased demand for real-time communication services such as internet telephony, video conferencing and instant messaging. In response to this increased demand, real-time communication service providers have proliferated. Many of these providers are companies unto themselves. Very often, however, real-time communication services for an enterprise (i.e. corporation or other organization) are provided internally on the enterprise's internal network. Regardless of who actually provides real-time services to computer users, configuring client computers for carrying out real-time communication functions is often a nightmare. In the enterprise setting, a network administrator has to go around to each client computer on the network to set it up. In the home setting, a user is usually forced to configure his or her own computer for real-time communication. These difficulties are exacerbated by the fact that, very often, the topology of the real-time communication service provider's network changes in such a way as to render invalid a user's previous configuration settings.

SUMMARY OF THE INVENTION

In accordance with the foregoing, a method and system for configuring a client computer for real-time communication is provided. According to the invention, configuration settings are sent to the computer in the form of a configuration document, such as mark-up language document, that is readable by the client computer. The client computer may request the configuration document on an as-needed basis, or may request to be notified whenever new configuration settings are needed.

The invention may be implemented on a network having a management database that maintains the current state of the network. A program executed by a server on the network monitors the database and, whenever a change is detected in the management database that would require new configuration settings for the client computers, the program transmits a document containing the new configuration settings to the client computers.

According to various embodiments, the invention uses a set-up initiation protocol, such as SIP, to enable the client computers to request and receive configuration settings. SIP includes SUBSCRIBE and NOTIFY message formats that allow for this functionality. Additionally, SIP uses a well-defined port and is therefore convenient to implement with firewalls.

Additional features and advantages of the invention will be made apparent from the following detailed description of illustrative embodiments that proceeds with reference to the accompanying figures.

BRIEF DESCRIPTION OF THE DRAWINGS

While the appended claims set forth the features of the present invention with particularity then, the invention, together with its objects and advantages may be best understood from the following detailed description taken in conjunction with the accompanying drawings of which:

FIGS. 10 and 11 show how a client computer requests and receives a configuration document having configuration settings for access control according to an embodiment of the invention.

DETAILED DESCRIPTION OF THE INVENTION

The invention is generally directed to a method and system for configuring a computer for real-time communication, in which a configuration document is transmitted to a client computer over a computer network, either at the request of the client computer itself, or automatically. The configuration document includes configuration settings that are appropriate for the real-time communication services of the network. The client computer executes a real-time communication client program that reads the configuration settings from the document and performs real-time communication functions according to the settings.

Although it is not required, the present invention may be implemented by program modules that are executed by a computer. Generally, program modules include routines, objects, components, data structures and the like that perform particular tasks or implement particular abstract data types. The term "program" as used herein may connote a single program module or multiple program modules acting in concert. The invention may be implemented on a variety of types of computers, including personal computers (PCs), hand-held devices, multi-processor systems, microprocessor-based programmable consumer electronics, network PCs, minicomputers, mainframe computers and the like. The invention may also be employed in distributed computing environments, where tasks are performed by remote processing devices that are linked through a communications network. In a distributed computing environment, modules may be located in both local and remote memory storage devices.

Figure 1:
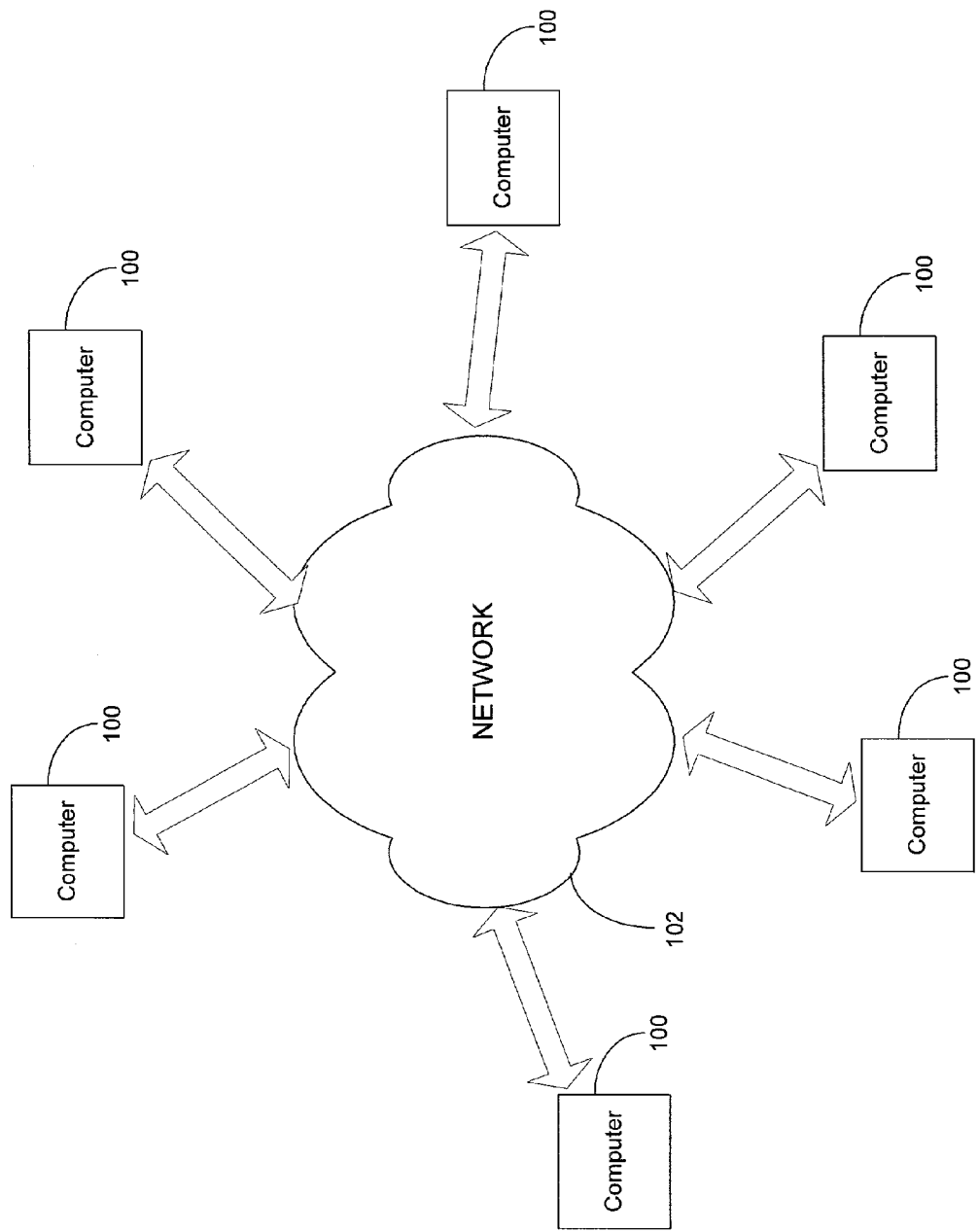
FIG. 1 is an example of a computer network.

An example of a networked environment in which the invention may be used will now be described with reference to FIG. 1. The example network includes several computers 100 communicating with one another over a network 102, represented by a cloud. Network 102 may include many well-known components, such as routers, gateways, hubs, etc. and may allow the computers 100 to communicate via wired and/or wireless media.

Figure 2:
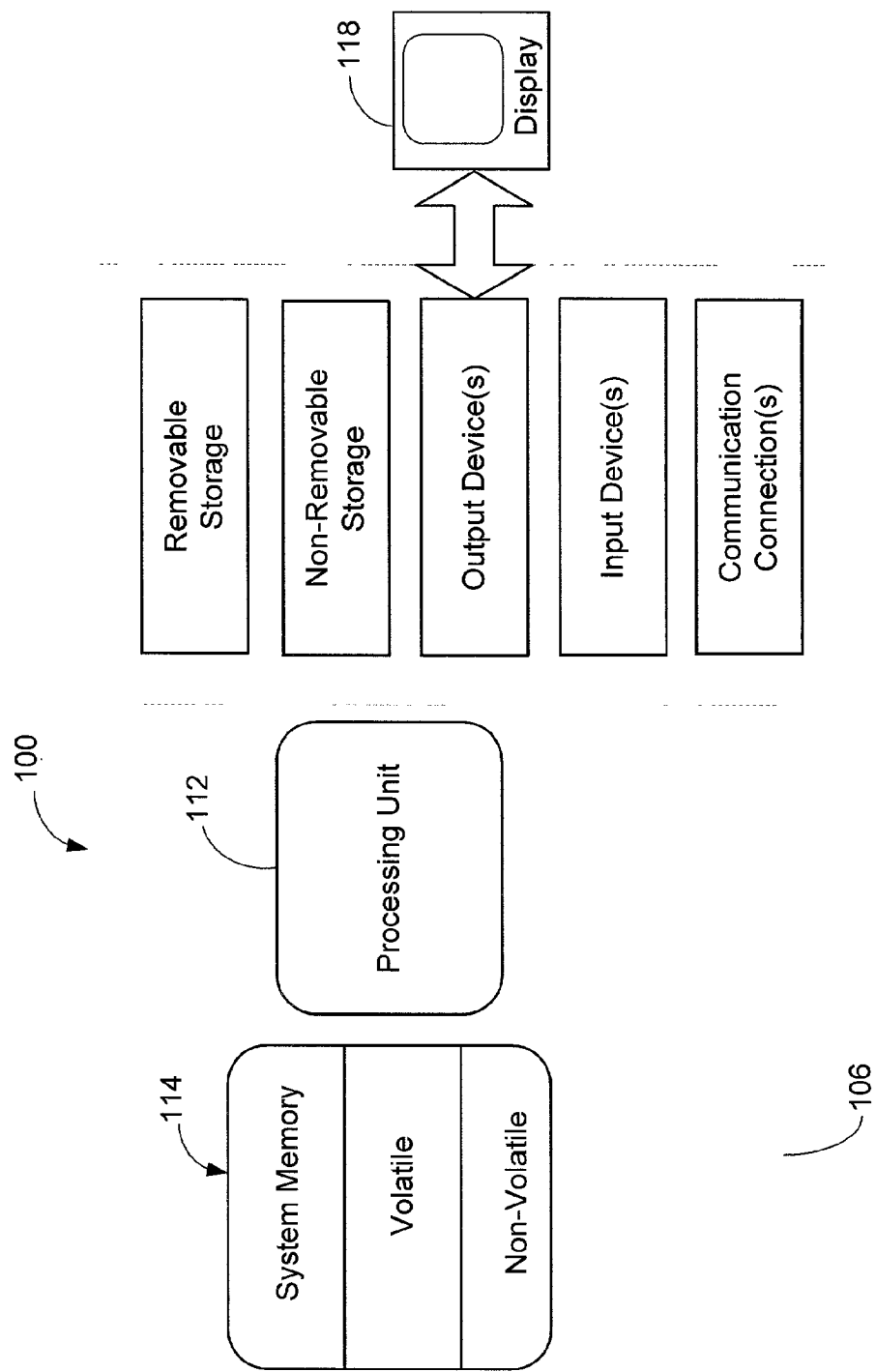
FIG. 2 is an example of a computer.

Referring to FIG. 2, an example of a basic configuration for a computer on which the system described herein may be implemented is shown. In its most basic configuration, the computer 100 typically includes at least one processing unit 112 and memory 114. Depending on the exact configuration and type of the computer 100, the memory 114 may be volatile (such as RAM), non-volatile (such as ROM or flash memory) or some combination of the two. This most basic configuration is illustrated in FIG. 2 by dashed line 106. Additionally, the computer may also have additional features/functionality. For example, computer 100 may also include additional storage (removable and/or non-removable) including, but not limited to, magnetic or optical disks or tape. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to stored the desired information and which can be accessed by the computer 100. Any such computer storage media may be part of computer 100.

Computer 100 may also contain communications connections that allow the device to communicate with other devices. A communication connection is an example of a communication medium. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. The term computer readable media as used herein includes both storage media and communication media.

Computer 100 may also have input devices such as a keyboard, mouse, pen, voice input device, touch input device, etc. Output devices such as a display 116, speakers, a printer, etc. may also be included. All these devices are well known in the art and need not be discussed at length here.

Figure 3:
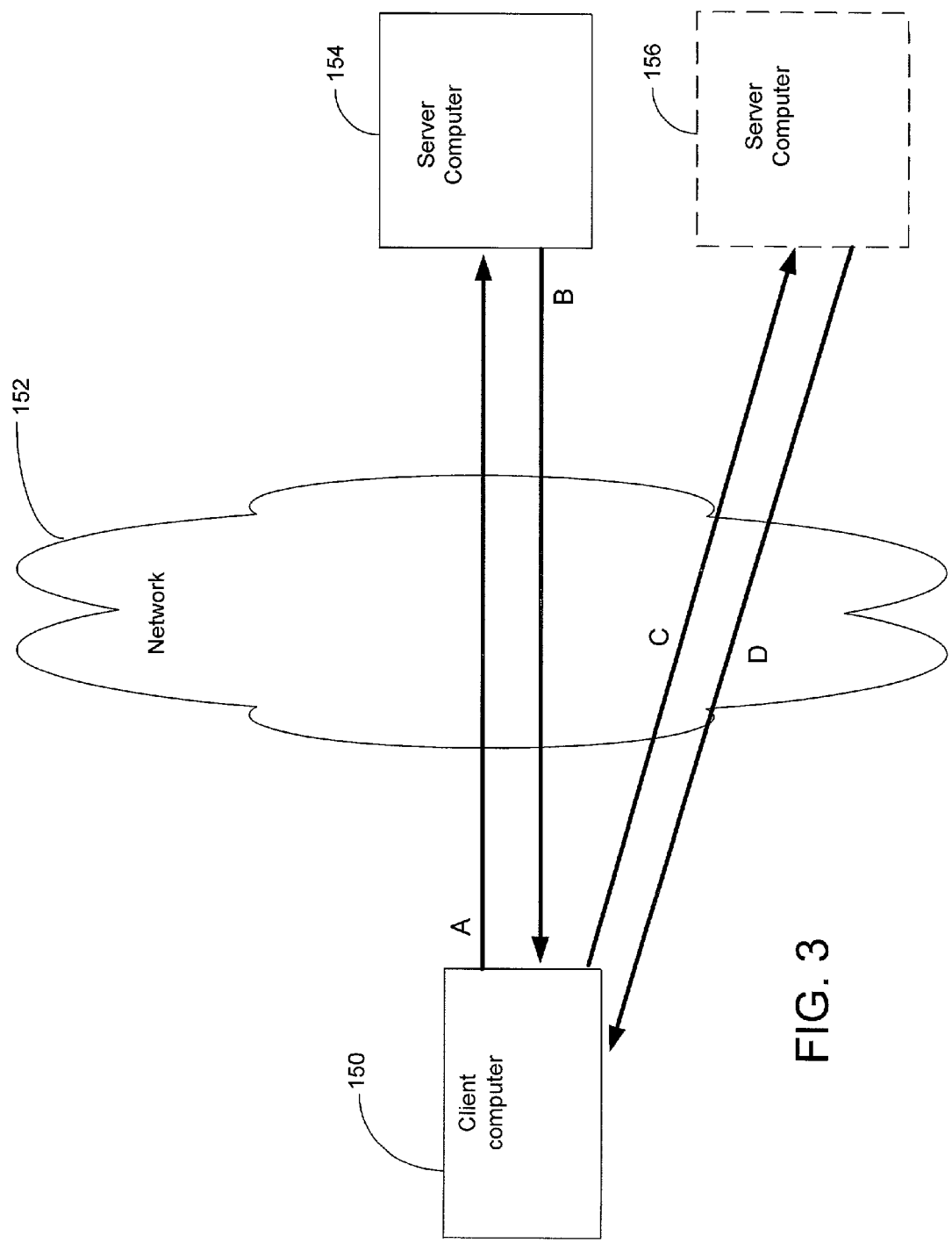
FIG. 3 shows a basic network to help illustrate the invention.

Referring to FIG. 3, a basic network is shown to help illustrate the invention. The network, generally labeled 152, includes at least one client computer 150, and at least one server computer 154. The client computer 150 is capable of performing real-time communication functions, such as Internet telephony, video conferencing, or instant messaging. The server computer 154 is capable of providing real-time communication services to the client computer 150. Such services may include assisting the client computer 150 in setting up an internet telephony call, providing a directory service to the client computer 150, and the like.

Figure 4:
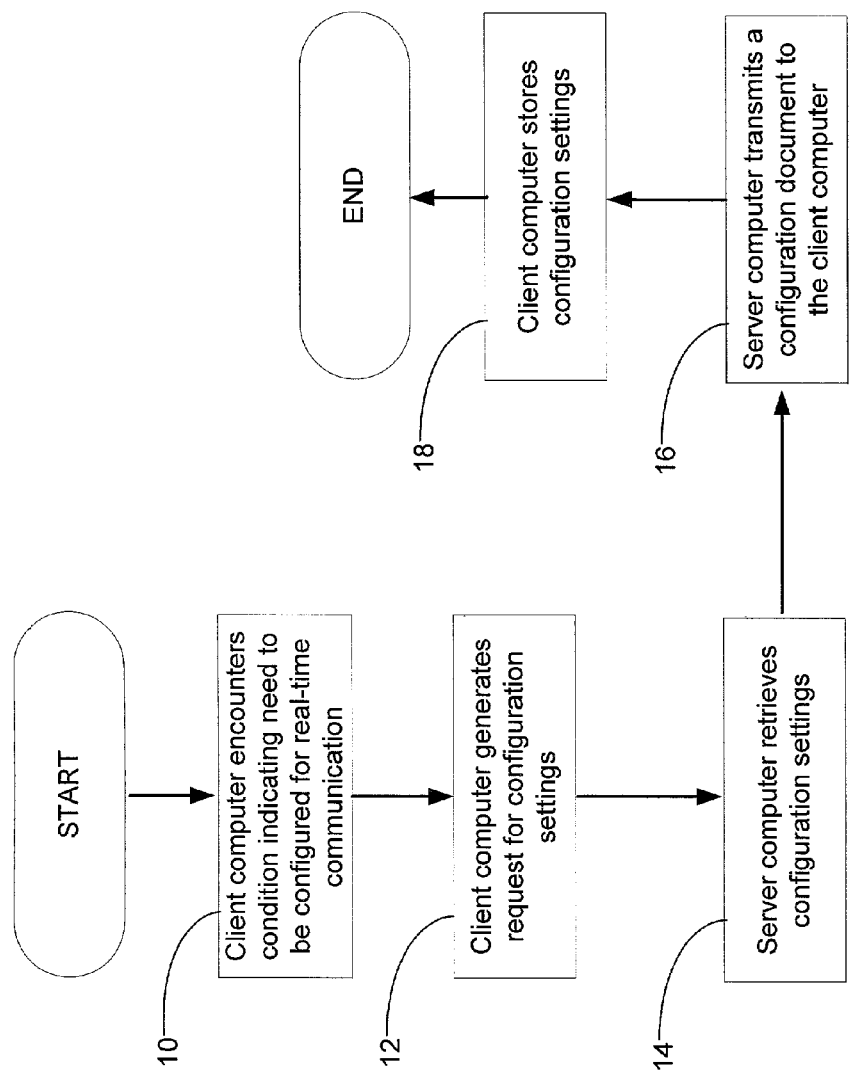
FIGS. 4 and 5 are examples of basic procedures carried out to configure a client computer for real-time communication according to an embodiment of the invention.

To configure a client computer for real-time communication according to an embodiment of the invention, a configuration document containing the correct configuration settings is provided to the client, and a real-time communication program that is capable of reading the document is executed on the client. An example of the basic procedure carried out to configure a client computer for real-time communication in this embodiment will now be described with appropriate reference to the network of FIG. 3 and to the flowchart of FIG. 4. At step 10 (FIG. 4), the client computer 150 encounters a condition that indicates that it needs to be configured for real-time communication. An example of such a condition is when a user at the client computer 150 installs a real-time communication program and the installation software requires the correct configuration settings. At step 12, the client computer 150 generates a request to the server computer 154 for the configuration settings (arrow A of FIG. 3). At step 14, the server computer 154 retrieves the appropriate configuration setting from a storage medium. At step 16, the server computer 154 transmits a configuration document containing the configuration settings to the client computer 150 (arrow B of FIG. 3). At step 18, the client computer 150 stores the configuration settings in a memory in a location that is accessible by a real-time communication client program executing on the client computer 150. The process then ends. The client computer 150 can now use the configuration setting to execute the real-time communication program and thereby perform real-time communication functions.

Figure 5:
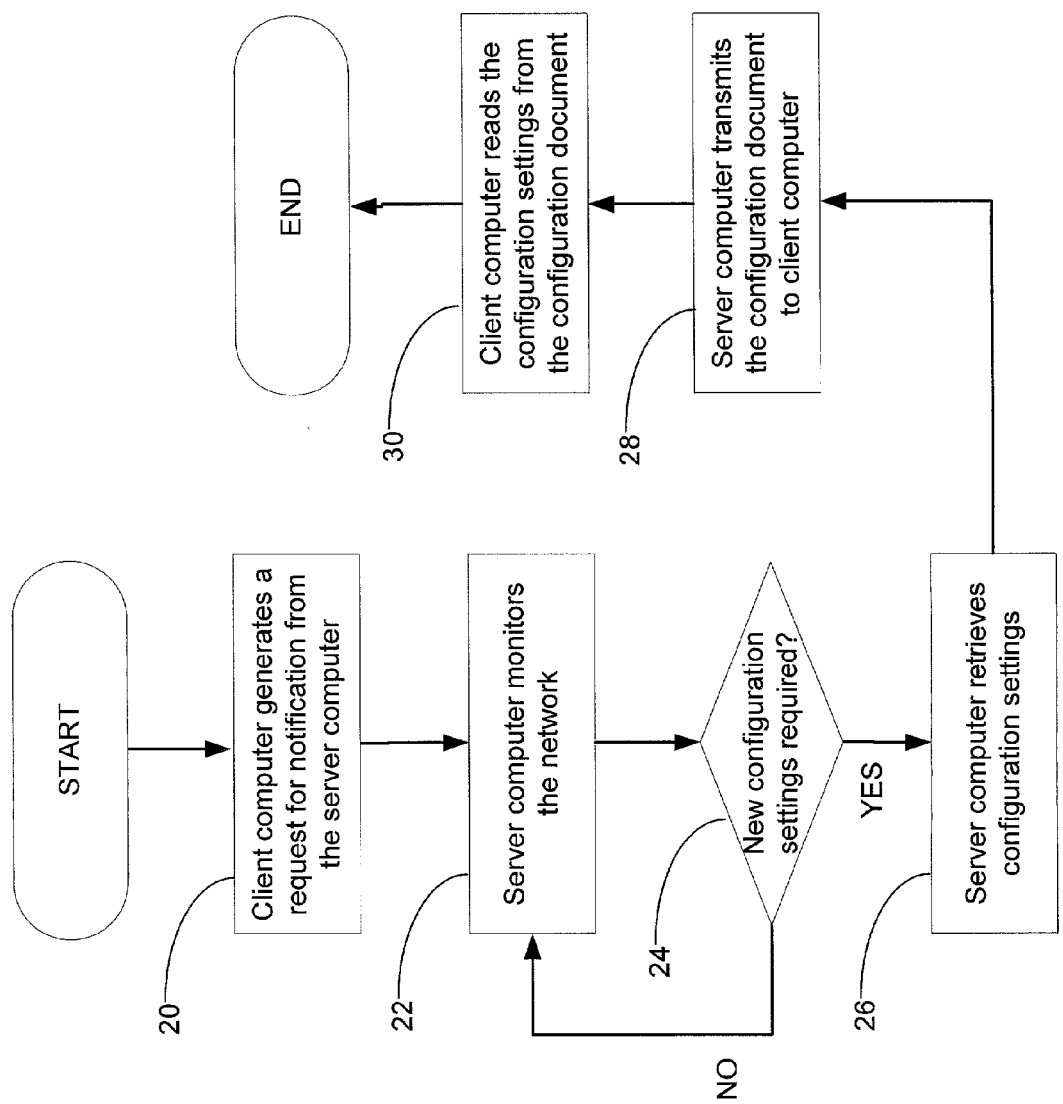

In another embodiment of the invention, a client computer may already be configured for real-time communication but may need to be updated whenever the required configuration settings change. An example of how this is accomplished will now be described with reference to the network of FIG. 3 and the flowchart of FIG. 5. At step 20 (FIG. 5), the client computer 150 generates request to have the server computer 154 notify the client computer 150 whenever an update to the configuration settings is required (arrow A of FIG. 3). At step 22, the server computer 154 monitors various conditions on the network 152 for any change that would indicate a need for the client computer 150 to have new configuration settings. If, at step 24, the server computer 154 detects a change that would require the client computer 150 to have new configuration settings, the procedure continues at step 26. Otherwise, the procedure returns to step 22. At step 26, after having detected a change that requires the client computer 150 to have new configuration settings, the server computer 154 retrieves the appropriate configuration settings from a storage medium. At step 28, the server computer 154 transmits the configuration settings as part of a configuration document to the client computer 150 (arrow B of FIG. 3). At step 30, the client computer 150 reads the new configuration settings from the received configuration document. The process then ends. The client computer 150 can now execute the real-time communication program and thereby perform real-time communication functions according to the new configuration settings.

The client computer 150 may perform the aforementioned real-time communication functions through the server computer 154 or through another server computer as specified by the configuration settings sent to the client computer 150 by the server computer 154. For example, the client computer 150 may have been previously configured to use server computer 154 as its Session Initiation Protocol (SIP) server. However, the administrator of the network 150 decides to add a new, second server computer, labeled 156 and shown with a dashed line, to the network 150, and wishes to use the second server computer 156 as the SIP server. The administrator could make the appropriate changes to the configuration document, and once the first server computer 154 updates the client computer 150 with the modified configuration document, the client computer 150 would automatically contact the second server 156 in future attempts to set up real-time communication sessions.

The client computer 150 and the server computer 154 (FIG. 3) can communicate in a variety of different ways and according to a variety of different protocols. Each of them can also be implemented according to a variety of different architectures. According to one embodiment, the server computer 154 provides the configuration settings to the client computer 150 in the form of one or more XML documents. Using a cross-platform language such as XML helps to minimize the number of different client programs that the client computer 150 is required to run. For example, the real-time communication client computer 150 could perform real-time communication functions with multiple real-time communication service providers and/or multiple real-time communication service formats. In that scenario, each different service provider or format provides its own configuration document. This allows the user of the client computer to avail of multiple service providers and/or formats without having to install multiple real-time communication client programs. For example, assume that an enterprise has multiple offices throughout the country, and these offices often need to conduct meetings with one another via videoconference. However, there are two different videoconferencing services that the enterprise uses: an internal service supported by the enterprise's network, and a contract service that is supplied by an outside videoconferencing company. The outside service is only used as backup when the internal service is down. Rather than forcing all of the workstations on the enterprise's network to have a different client program for each of the two services, a single client program structured in accordance with an embodiment of the invention is installed on each of the workstations. A different XML configuration document for each of the services is then made available on the network to each of the client programs, in which each XML document contains the appropriate configuration setting for its respective service.

An example of how the client computer 150 of FIG. 3 can be configured for internet telephony using an XML document in accordance with an embodiment of the invention will now be described. In this example, it is assumed that the user, Bob, uses Acme (represented by the first server computer 154) as his Internet service provider. Acme notifies Bob via email that a new service for making cheap phone calls from his PC is being introduced and the mail contains a link for signing up. When he clicks on the link, he's redirected to a web page (Arrow A of FIG. 3), which prompts him for some information, such as a user name, password, or other data that can be used to uniquely identify the user to the service. After Bob enters the required information, the web server (running on the server computer 154) executes web script and uses a real-time communication application programming interface (API) to push an XML document containing Bob's profile to Bob's client computer (Arrow B of FIG. 3). A "profile" refers to a set of configuration settings that allow a user, in this case Bob, to use a particular real-time communication service. The next time Bob uses his real-time communication client program, he can make phone calls through Acme without making any changes to his software.

After some time, Bob comes across another service provider, CallAreUs.com, which is providing great rates for international calls. Since Bob frequently makes international calls, he decides to give it a try. He signs up with CallAreUs.com (Arrow C of FIG. 3), and CallAreUs.com pushes a new profile to Bob's computer in the same manner as described above with respect to Acme (Arrow D of FIG. 3). Now, when Bob uses his real-time communication client program, he sees that he has a choice of two service providers to make phone calls, Acme and CallsAreUs.com. He can choose the service provider he wants to use depending on the destination number he's calling. In this embodiment, Bob is not required to download, install and use multiple client programs.

An example of an XML configuration document containing the profile settings for Bob to avail of the Acme's Internet telephony service is as follows:

```
<ResClientProvisioningInfo xmlns="provisioning.xml">
<ProfileInfo Key="9C0BD033-D0B2-4d12-8DD1-16A49F381BBE"
LastUpdated="2000-06-26">
    <SchemaVersion>
        <MajorVersionNumber>0</MajorVersionNumber>
        <MinorVersionNumber>5</MinorVersionNumber>
    </SchemaVersion>
</ProfileInfo>
<ITSPInfo ITSPName="Acme"
        URIHomepage="http://www.acme.com"
        URIHelpdesk="http://www.acme.com/helpdesk"
URIPersonalAccount="http://www.acme.com/helpdesk?user=John
Smith,password=not4now"
        URIDisplayDuringCall="http://www.acme.com/duringcall"
        URIDisplayDuringIdle=http://www.acme.com/duringidle"
    URIProvisioningUpdate="http://www.acme.com/provisioningrequest"
        NextUpdate="2000-07-07"/>
<UserInfo UserId="John Smith" Password="not4now"
UserURI="jsmith@acme.com"/>
<SIPServer Address="264.23.34.231" Transport="UDP"
AuthMethod="digest" Role="Proxy">
    <SessionInfo mode="FirstParty">
        <TerminalInfo ConsumerTerminal="IP_Terminal"
ProviderTerminal="IP_Terminal"/>
    </SessionInfo>
    <SessionInfo mode="FirstParty">
        <TerminalInfo ConsumerTerminal="IP_Terminal"
ProviderTerminal="PSTN_Terminal"/>
    </SessionInfo>
</SIPServer>
<SIPServer Address="264.23.34.232" Transport="SSL"
AuthMethod="digest" Role="Proxy">
    <SessionInfo mode="ThirdParty">
        <TerminalInfo ConsumerTerminal="PSTN_Terminal"
ProviderTerminal="PSTN_Terminal"/>
    </SessionInfo>
</SIPServer>
<ITSPPrivateData>
    <ProvisioningVersion>1.0</ProvisioningVersion>
    <AccountType>FlatFee</AccountType>
</ITSPPrivateData>
</ResClientProvisioningInfo>
```

An explanation of the parameters used in the example file sent to Bob from Acme in the previous example is as follows:

1) ResClientProvisioningInfo. An XML namespace tag to uniquely identify the type of XML document.
2) ProfileInfo Key. This is an ID number (such as a Globally Unique ID or GUID) that is used to uniquely identify a profile on the client computer. It is used in the event that the client computer maintains multiple profiles.
3) Schema Version. This is the version of the XML schema upon which the configuration document is based.
4) ITSPInfo. These are the settings that are particular to each Internet telephony service provider.
   a. ITSPName. This is the name of the Internet telephony service provider.
   b. URIHomePage. This is the Uniform Resource Identifier of the home page that is displayed by the client real-time communication program.
   c. URIPersonalAccount. This is the Uniform Resource Identifier that can be used to by the client computer to display personal account details of the user.

d. URIDisplayDuringCall. This is the Uniform Resource Identifier that should be displayed by the client computer during an Internet phone call for the purposes of displaying marketing information to the user.
e. URIDisplayDuringIdle. This is the Uniform Resource Identifier that should be displayed by the client computer during idle periods for the purposes of displaying marketing information to the user.
f. URIProvisioningUpdate. This is the Uniform Resource Identifier that the user needs to access in order to obtain an updated version of the XML document that contains his profile settings.
g. NextUpdate. This is when the user's profile settings will need to be updated at the Uniform Resource Identifier specified by the URIProvisioningUpdate parameter.

5) UserInfo. These are settings that are applied to the user once the user has been authenticated against a real-time communication server.
  a. UserID. This is the user's unique ID that the real-time communication server uses to authenticate the user.
  b. Password. This is the password that the real-time communication server uses to authenticate the user.
  c. UserURI. This is the user's Uniform Resource Identifier, which is typically in the format of an email address.

6) SIPserver. These settings are used to specify which SIP servers are available to the client computer. As there may be multiple SIP servers in a network, there may be multiple sets of SIP server settings.
  a. Address. This is the hostname of the real-time communication server.
  b. Transport. This is the transport protocol that the real-time communication client program is to use to connect to the real-time communication server. Examples include TCP, UDP, TLS and HTTPS.
  c. AuthMethod. This is the form of authentication that is to be used by the client computer. Examples include Basic, Digest, NTLM, Kerberos, and Cert.
  d. Role. This is the role of the SIP server. Examples include Proxy and Registrar.
  e. SessionInfo. The communication modes supported by the SIP server.
    1) mode. This specifies the mode in which the call will be made. Examples include First Party and Third Party.
    2) TerminalInfo. This specifies what kind of terminals are to be used.
      1. ConsumerTerminal. This is what kind of terminal the consumer will use. Examples include PSTN Terminal and IP Terminal.
      2. ProviderTerminal. This is what kind of terminal the Internet telephony service provider will use. Examples include PSTN Terminal and IP Terminal.

7) ITSPPrivateData. This includes data that is a particular Internet telephony service provider may want to use. Examples include:
  a. ProvisioningVersion. This is the version number of the configuration information contained in the XML profile document.
  b. AccountType. This is the pay structure that the user has signed up for.

In various embodiments of the invention, the client computer and the server computer 154 (FIG. 3) communicate using well-known networking protocols, including, but not limited to TCP, IP, FTP, and HTTP. In some embodiments, the client computer and the server computer 154 invoke functions on each other through various API's.

The invention can be implemented in a variety of computing environments. In the previous example, Bob could have been a home user or a user of an enterprise network. In the enterprise network context various embodiments of the invention allow policy settings to be configured on client computers. Policy settings are established on a global basis, for a group of users, or for individual users, and control which forms of communication various client computers are permitted to be conducted. Through the use of policy settings, an administrator can, for example, disallow audio, video or instant messaging, regardless of which server the client computer uses in performing real-time communication functions. In an embodiment of the invention, the client computer enforces the policy settings and insures that the policy settings are made known to the user by disabling menus, buttons and the like. Examples of policy settings include:

1) Expires. This specifies (in hours) the length of time that the policy settings should be considered valid. After this time the client computer should send another request for the policy.
2) SVR. This is used to specify which domains to which a client computer is allowed to connect. This setting can be used, for example, to restrict a client computer from connecting to any other service that is not within the local domain. By default this option allows for the use of any service.
3) Proxy. This is used to specify the default server computer to be used for any traffic that is not within the local domain.
4) FTP. This option is used to enable or disable the File Transfer capabilities of the client computer. If disabled, the client computer cannot start or receive files. By default file transfers are allowed.
5) PC2PC. This option is used to enable or disable the PC to PC audio capabilities of the client computer. If disabled, the client computer cannot start or receive audio. By default PC to PC audio is allowed.
6) PC2Ph. This option is used to enable or disable the PC to phone audio capabilities of the client computer. If disabled, the client computer cannot start PC to phone calls. By default PC to Phone audio is allowed.
7) Ph2Ph. This option is used to enable or disable the Phone-to-Phone capabilities of the client computer. If disabled, the client computer cannot start Phone-to-Phone calls. By default Phone to Phone calls are allowed.
8) Video. This option is used to enable or disable the video capabilities of the client computer. If disabled, the client computer cannot start or receive video. By default video is allowed.
9) IM. This option is used to enable or disable Instant Messaging capabilities of the client computer. If disabled, the client computer cannot send or receive Instant Messages. By default Instant Messaging is allowed.
10) DataCollab. This option is used to enable or disable Data Collaboration (Whiteboard or Application Sharing) capabilities of the client computer. If disabled, the client computer cannot start or receive any Whiteboard and Application Sharing sessions. By default Data Collaboration is allowed.

Figure 6:
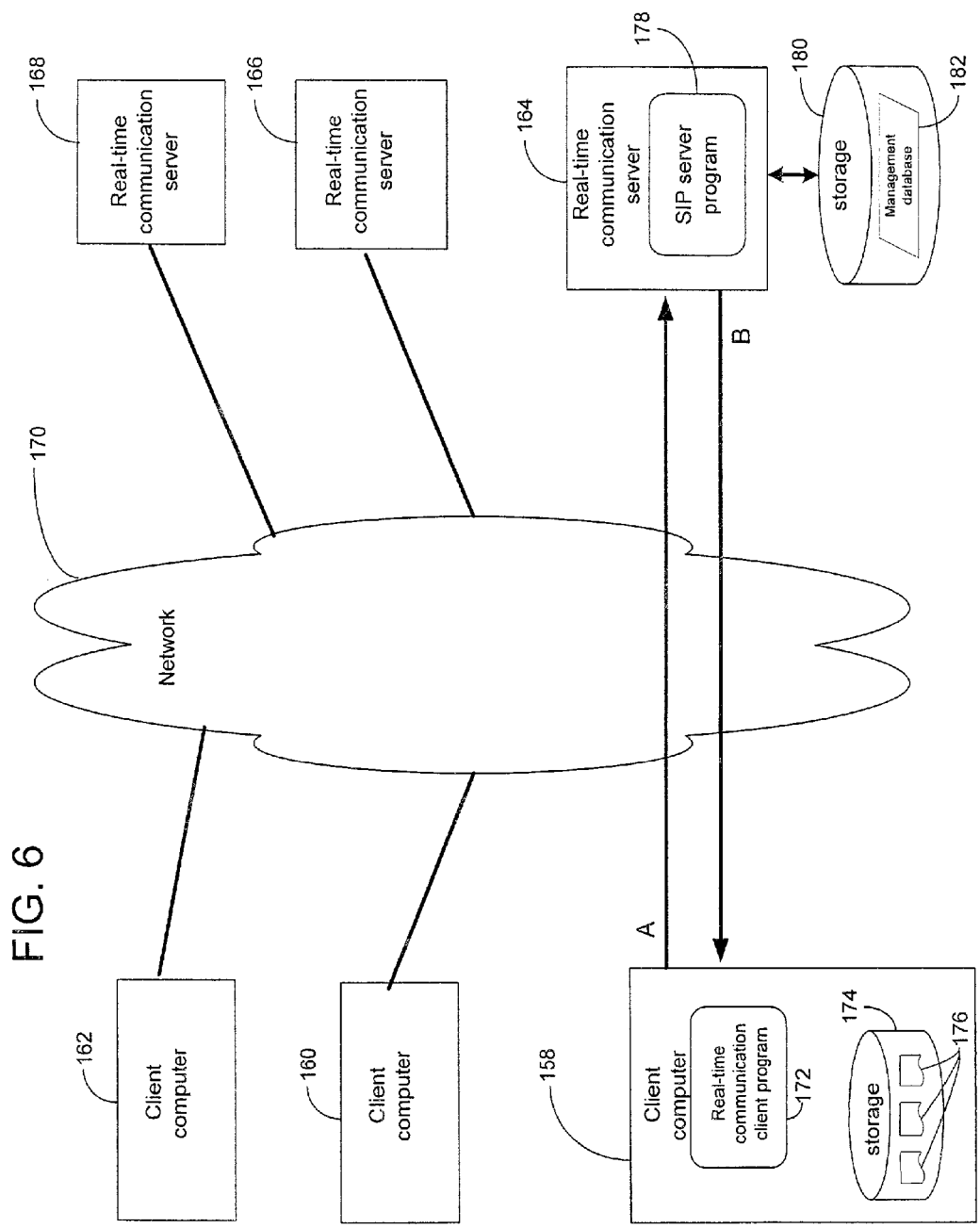
FIG. 6 shows an embodiment of the invention.

With reference to FIG. 6, another embodiment of the invention will now be described. As shown in FIG. 6, a computer network 170 includes a first client computer 158, a second client computer 160 and a third client computer 162. The network 170 also includes a first real-time communication server 164, a second real-time communication server 166 and a third real-time communication server 168. The first, second and third client computers 158, 160 and 162 each have the same basic architecture. For ease of reference, only the architecture of the first client computer 158 and the first real-time communication server 164 are depicted in detail.

A real-time communication client program 172 executes on the first client computer 158. The real-time communication client program 172 performs real-time communication functions such as Internet telephony, video conferencing and instant messaging, thereby allowing a user at the first client computer 158 to avail of real-time communication services of the network 170. The first client computer 158 has a storage medium 174 that can be implemented as any type of computer readable medium. The storage medium 174 has stored therein configuration documents 176, which include various real-time communication configuration settings. The documents 176 are used by the real-time communication client program 172 to perform real-time communication functions.

In an embodiment of the invention, each one of the documents 176 contains the configuration settings for a single real-time communication service and/or service provider. Thus, for example, one of the documents 176 might contain configuration settings for Internet telephony while another might contain configuration settings for an instant messaging service. Yet another of the documents 176 might contain the configuration for a different instant messaging service. Although the configuration documents 176 may be implemented according to a variety of formats, mark-up languages such as XML are known to be suitable.

Referring again to FIG. 6, the first real-time communication server 164 executes a SIP server program 178. The SIP server program 178 provides data and services related to the well-known Session Initiation Protocol (SIP) to the first, second and third client computers 158, 160 and 162. Other session initiation protocols besides SIP may be used in other embodiments of the invention.

The first, second and third real-time communication servers 164, 166 and 168 provide real-time communication services to the first, second and third client computers 158, 160 and 162. For example, the second real-time communication server 166 could be an internet telephony server that the first and third client computers 158 and 162 use to set up internet phone calls to one another. Although this embodiment assumes that the configuration documents are provided to the client computers by one or more of the real-time communication servers 164, 166 and 168, the documents could also be provided by other computers that don't necessarily provide real time communication services.

The first real-time communication server 164 has access to a storage medium 180 on which a management database 182 is stored. The management database 182 includes information as to the current state of the network 170 and the location of various resources of the network 170. The management database may be implemented in a variety of ways, but the MICROSOFT ACTIVE DIRECTORY is known to be suitable. Although the management database 182 is shown as being stored on a single storage medium, it can, in fact, be distributed among many different media of many different computers.

The management database 182 can be changed by a system administrator of the network 170, by a user with sufficient access permission, or automatically as a result of changes in the network 170. For example, an administrator of the network 170 might, in response to a virus threat, wish to establish a policy that restricts all users from making FTP downloads. The administrator would simply edit/create the appropriate policy in the management database 182. Each client computer would eventually receive a new configuration document containing the policy. In another example, a user on the network 170 might change his or her password, which would be reflected in the management database 182 and would trigger the transmission of a new configuration document to the user's client computer. In yet another example, a new real-time communication server computer might be added to the network 170. The new server computer would register itself with the management database 182 and, as a result, the SIP server program 178 would transmit a configuration document containing configuration settings needed to use new server computer to the client computers.

According to an embodiment of the invention, the SIP server program 178 provides configuration documents to the first, second and third client computers 158, 160 and 162, and provides updates to those documents in response to changes that are made in the management database 182. The configuration documents and updates can be provided to one of the client computers in response to a request from the client computer or as part of an ongoing update service to which the client computer had previously subscribed. Referring again to FIG. 6, the client computer 158 obtains configuration documents as well as updates to the configuration documents from the real-time communication server 164 by executing the real-time communication client program 172 to send requests for the documents and updates in the form of SIP messages to the SIP server computer 164. Similarly, the real-time communication server 164 provides the documents and updates to the client computer 158 by executing the SIP server program 178 to transmit the documents and updates in the form of SIP messages to the client computer 158. For example, the real-time communication client program 172 on the client computer 158 could request configuration data from the SIP server program 178 by sending a SIP SERVICE message. Additionally, the real-time communication client program 172 could request that the SIP server program 178 provide updates as needed to the real-time communication client program 172 by sending a SIP SUBSCRIBE message to the SIP server program 178. Those updates would then be provided by the SIP server program 178 via a SIP NOTIFY message.

Figure 7:
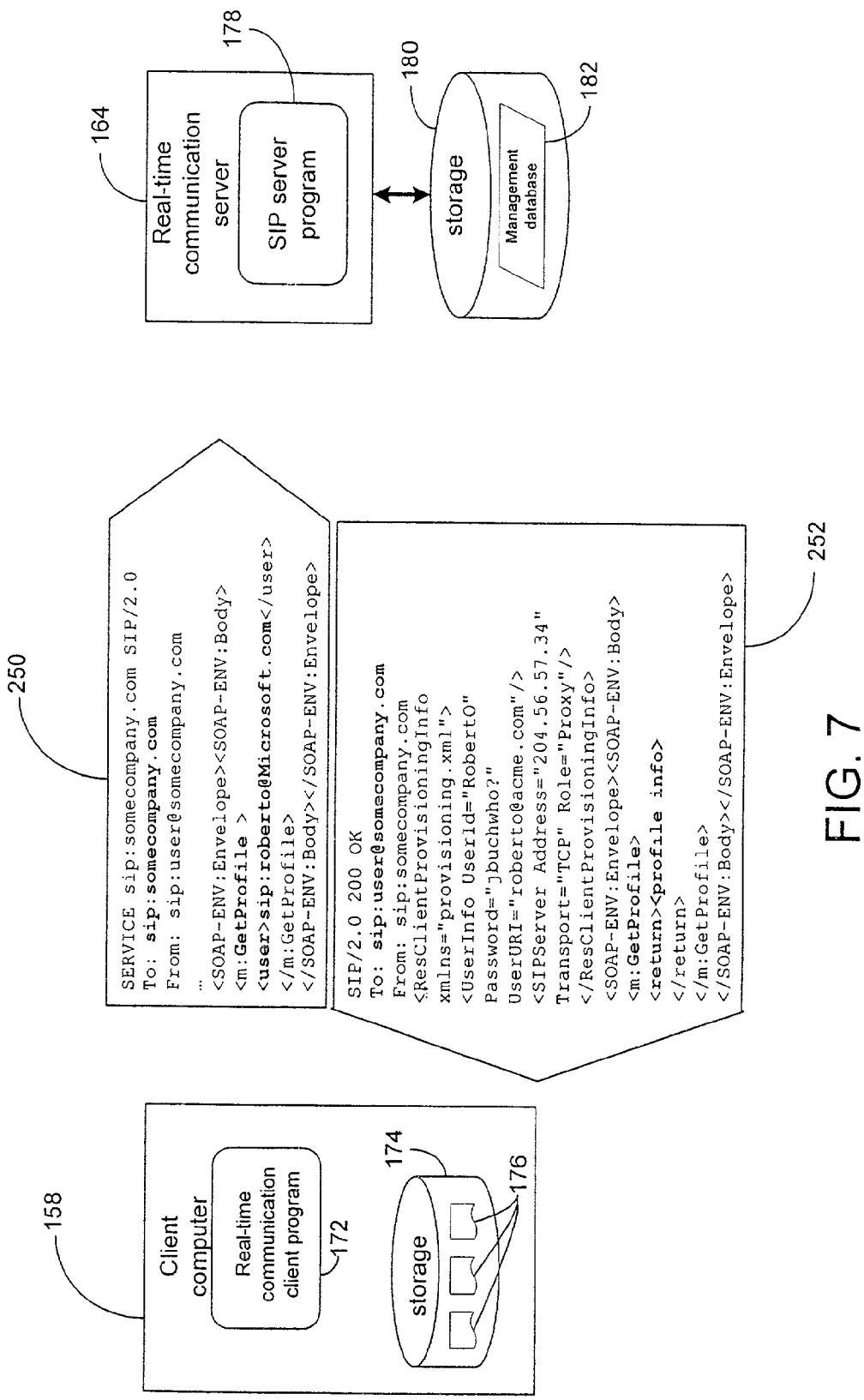
FIG. 7 shows an example of how a client computer makes a request for a profile in an embodiment of the invention.

Referring to FIG. 7, an example of how the client computer 158 from FIG. 6 obtains the profile settings for the user "roberto" from the real-time communication server computer 154 is shown. The real-time communication client program 172 first sends a document 250 that contains a SERVICE message, which is formatted according to the SIP protocol, to the server computer 164. As shown, the SERVICE message includes a block of XML text. The XML text is formatted according to the well-known Simple Object Access Protocol (SOAP), and contains a "Get Profile" request. The real-time communication server computer 164 responds with an "OK" message 252 formatted according to standard SIP format and including a block of SOAP formatted XML text. The XML text sent by the real-time communication server 164 includes the profile for "Roberto." The profile itself may have a variety of configuration settings such as those discussed above, and is generally designated in FIG. 7 as "profile info."

Figure 8:
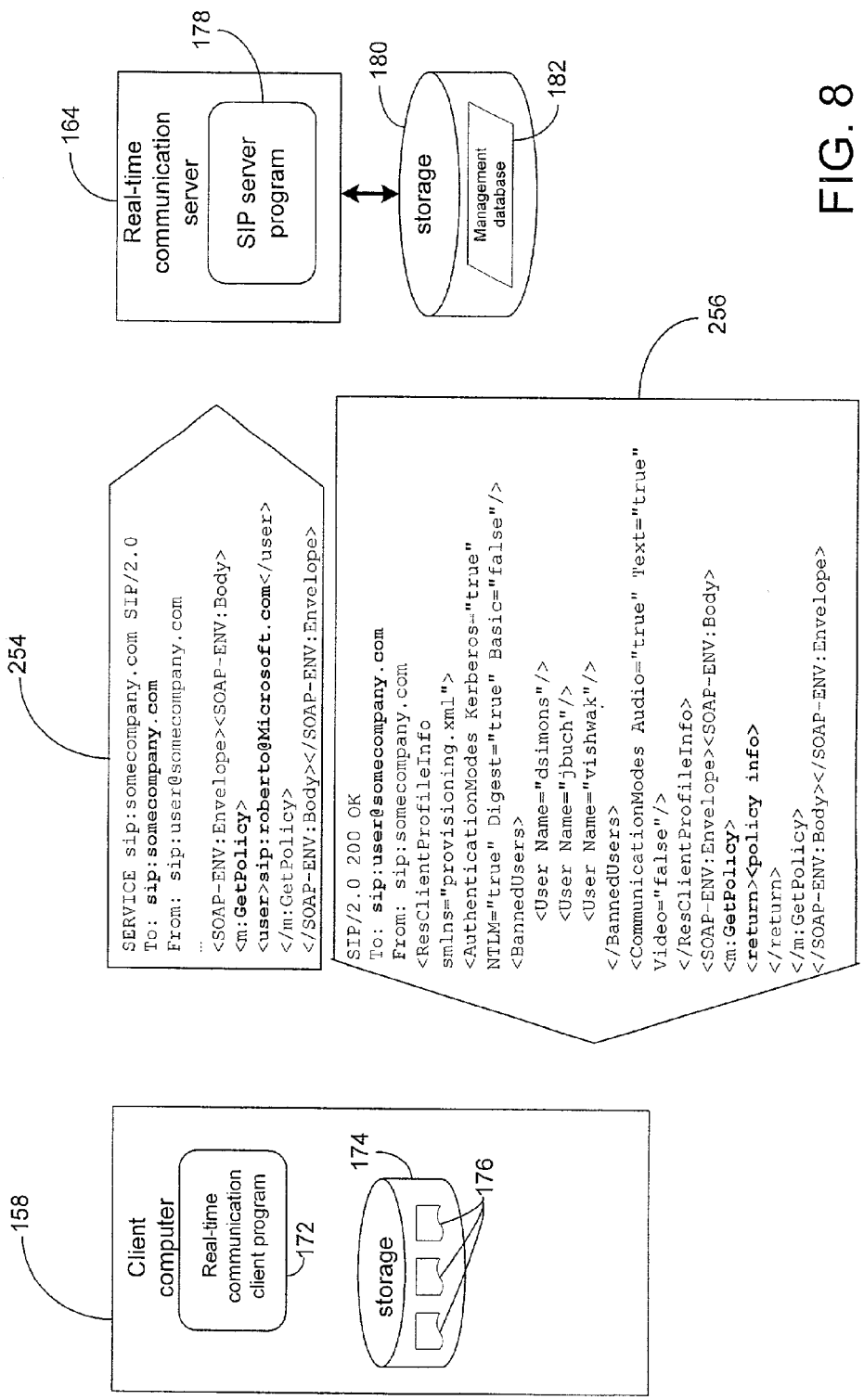
FIG. 8 shows an example of how a client computer requests policy settings according to an embodiment of the invention.

Referring to FIG. 8, an example of how the client COMPUTER 158 obtains the policy for the user "roberto" from the real-time communication server computer 164 is shown. The client computer 158 sends a SIP SERVICE message 254, having a block of SOAP formatted text that includes a "Get Policy" request to the server computer 164. The real-time communication server computer 164 responds with a document 250 that contains SIP "OK" message having a block of SOAP-formatted XML text that includes the policy. The policy itself may have a variety of configuration settings (specifically, policy settings) such as those discussed above, and is generally designated in FIG. 8 as "policy info."

An example of how the invention may be implemented in an enterprise network will now be described. In this example, the enterprise network has a system set up that regulates the ability of users on the network to communicate with and/or monitor one another through the use of access control rights. Access control rights are granted on a per user basis or on a per group basis and govern such things as whether a user is allowed to monitor another user's "presence" (i.e. determine whether they are logged onto the network and what their network address is), whether a user is permitted to call another user via internet telephony, whether a user is to be prompted before allowing someone to monitor him or her, and the like.

Figure 9:
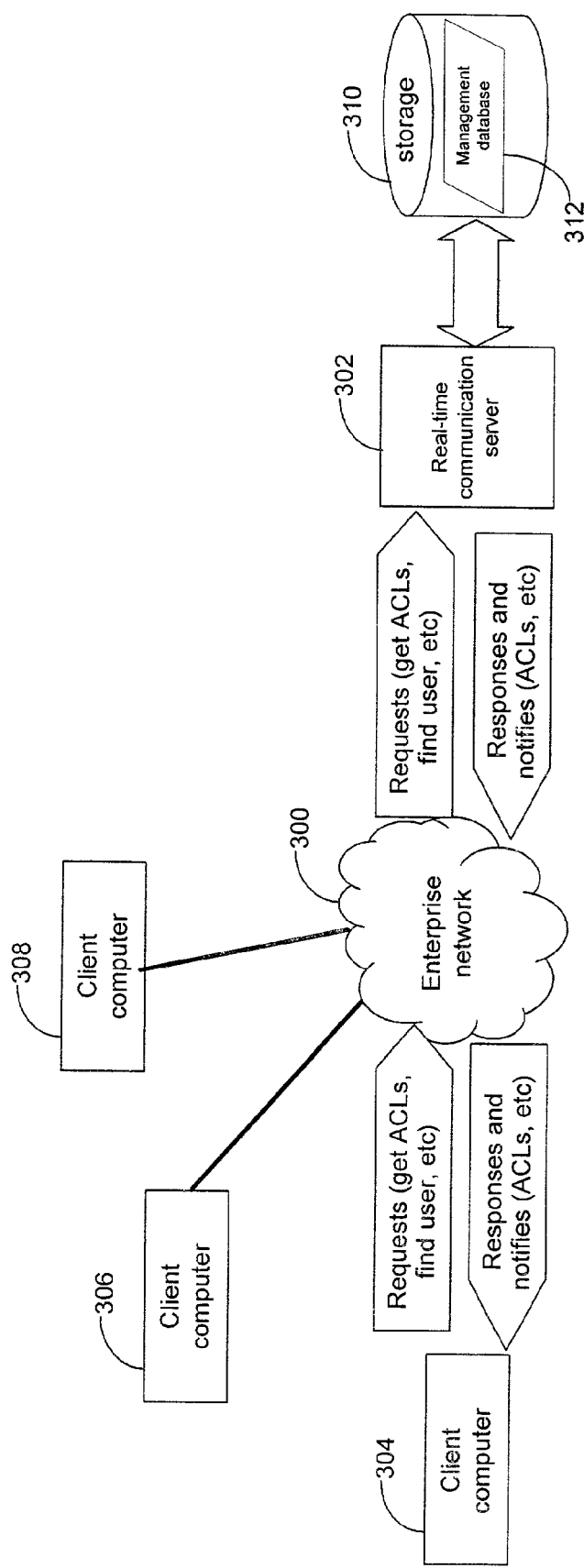
FIG. 9 shows another embodiment of the invention.

In continuing with the enterprise network example, reference is made to FIG. 9, in which the enterprise network, generally labeled 300 is shown. The enterprise network 300 includes first, second and third client computers 304, 306 and 308. The enterprise network 300 also includes a real-time communication server 302, which has access to a computer-readable medium 310 having stored thereon a management database 312. The real-time communication server 302 and management database 312 have the same functionality as the real-time communication server 164 and management database 182 of FIG. 6. In this example, however, they also manage access control with respect to the users of the network 300.

The concept of access control as it applies to this embodiment of the invention will now be discussed in more detail. For each user or group of users of the network 300 (FIG. 9), there is a corresponding access control list that specifies what that user or group of users is permitted to do with regard to other users or groups of users. In this embodiment of the invention, there are at least two types of rights: "Incoming" and "Presence." Incoming rights govern things such as whether or not a user is allowed to send an instant message to another user. Presence rights govern the ability for a user to monitor whether another user is online. The values to which each of these rights can be set in an embodiment of the invention are as follows:

| Right | Value | Abbreviation | Meaning |
| --- | --- | --- | --- |
| INCOMING | Allow | "A" | User having this level of access can invite another user to communicate. |
| | Timeout | "T" | User having this level of access can invite another user to communicate, but the user's real-time communication client program will always timeout the call. This is a polite way of blocking the and equates to the phone "ringing off the hook". |
| | Deny | "D" | User having this level of access cannot invite another user to communicate. |
| PRESENCE | Allow | "A" | A user can query or subscribe to another user's presence and will be notified when status changes occur |
| | Prompt | "P" | A user having this level of access can attempt to subscribe to another user's presence, but the other user will be prompted for permission |
| | Block | "B" | A user having this level of access may subscribe to another user's presence, but the other user will always appear to be offline. |
| | Deny | "D" | A user with this level of access cannot even subscribe to the other user |

Continuing the discussion of access control, a user or a group of users will also be referred to herein as an "identity." There are many possible ways to designate an identity. In an embodiment of the invention, the following types of identities exist.

| Identity Type | Meaning |
| --- | --- |
| ALL | All users and groups. |
| DOMAIN | All users in this domain |
| URI | Used to specify a particular user. |

Each access control list has one or more access control entries. Each access control entry confers one or more rights to an identity. For example, possible access control entries for the user joeb@microsoft.com include:

| Identity | Access Right(s) | Meaning |
| --- | --- | --- |
| ALL | INCOMING = Allow | Anybody can communicate with joeb@microsoft.com |
| | PRESENCE = Prompt | Nobody can access the joeb's presence without joeb being prompted to grant permission. |
| DOMAIN "microsoft.com" | INCOMING = Allow | Anybody at Microsoft can communicate with Joeb |
| | PRESENCE = Prompt | Nobody at Microsoft can access the joeb's presence without joeb being prompted to grant permission. |

-continued

| Identity | Access Right(s) | Meaning |
| --- | --- | --- |
| URI "roberbr@microsoft.com" | INCOMING = Deny PRESENCE = Deny | The user roberbr@microsoft.com is specifically blocked from any access to joeb. |

According to an embodiment of the invention, the administrator of the network 300 (FIG. 9) can set a "default" access control list that is applied to all users in a particular group. If an access control entry in the user's personal access control list has the same identity as an access control entry in the default access control list, then the personal access control entry takes precedent over the default access control entry. This merging is done at the server when a user's access control list is retrieved. Client software will only ever see the merged access control list. At install, according to an embodiment of the inventions, the default access control list is set to:

| Identity | Access Right(s) | Meaning |
| --- | --- | --- |
| DOMAIN "<insert domain Name>" | INCOMING = Allow PRESENCE = Allow | Allow others in the user's domain full access to the user |
| ALL | INCOMING = Allow PRESENCE = Prompt | Defaults the access for all other users to allow incoming communication, but no access to presence without the owner explicitly granting |

The administrator may also set a "mandatory" access control list that is applied to all users in a particular group.

In an embodiment of the invention, the first, second, and third client computers 304, 306 and 308 receive two access control lists: the mandatory access control list and the user's personal access control list (that has already been merged with the default access control list). The client is responsible for enforcing the mandatory access control list, even when the user's personal access control list may contradict it. An access control entry in the user's personal access control list is overridden by an access control entry in the mandatory access control list whenever:

An access control entry in the user's access control list has the same identity as an access control entry in the mandatory access control list.

An access control entry in the user's access control list has a USER identity from a domain matching a DOMAIN access control entry in the mandatory access control list.

The mandatory access control list has an "ALL" access control entry.

Figure 10:
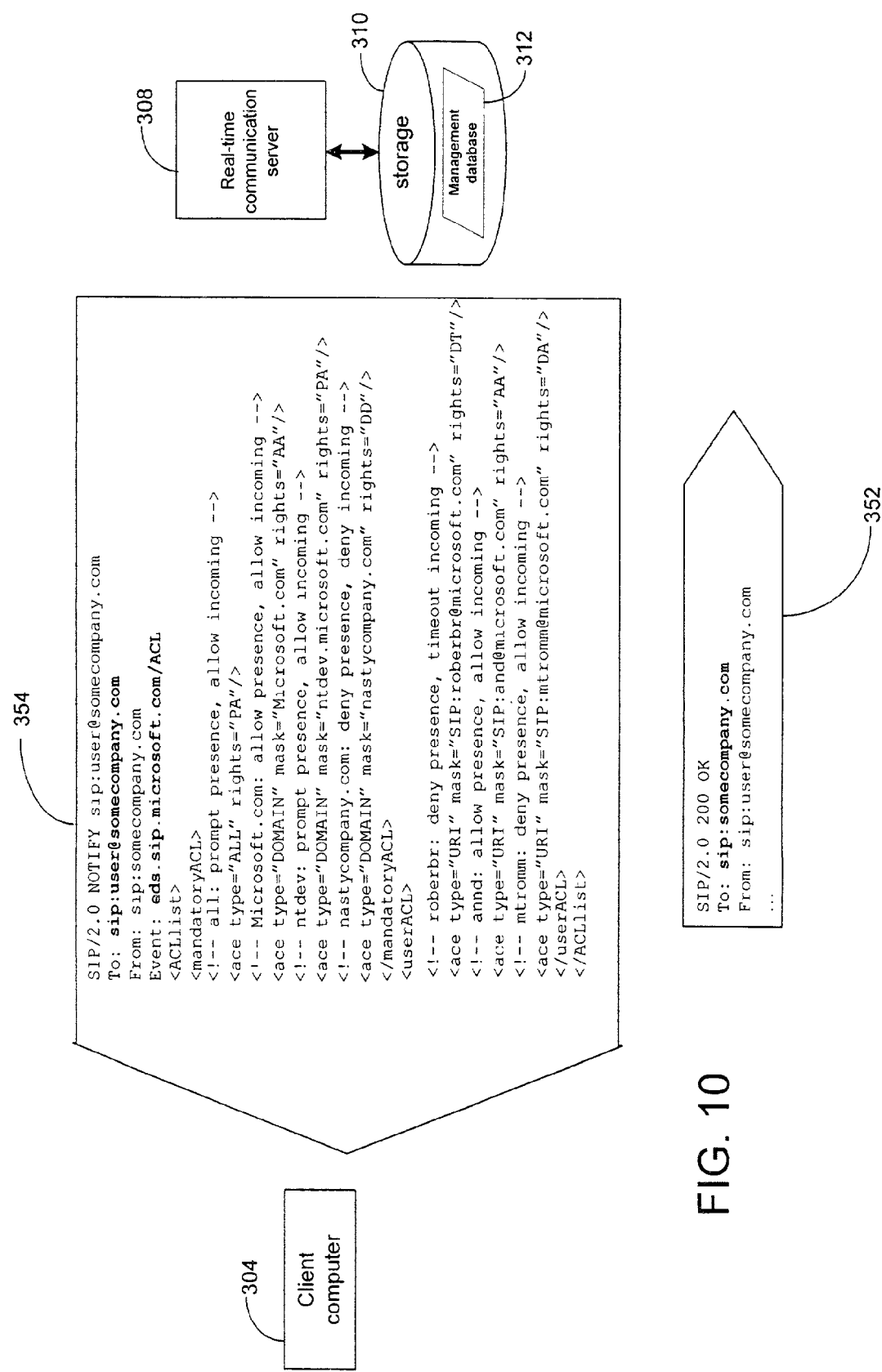

Referring to FIG. 10 an example of how the first client computer 304 (from FIG. 9) obtains configuration settings for access control from the real-time communication server 302 will now be described.

In this example, the client computer 304 is assumed to have previously subscribed (using a SIP SUBSCRIBE message) to an "event" that is triggered whenever the management database 312 has a new access control list for the user of the client computer 304. The real-time communication server 308 monitors the management database 312, and upon detecting the presence of a new access control list for the user, transmits a document 350 containing a block of XML text that has the new access control configuration settings. The client computer 304 responds with a document 356 containing a SIP "OK" message. As shown in the example, these settings indicate that the user is to be prompted when anyone ("ALL") tries to monitor the user's presence. Anyone may send incoming real-time communication traffic to the user, however, as long as they are not bound by any other settings. The access control configuration settings also include more specific settings and, in general, more specific settings override less specific settings. For example, anyone in the domain "nasty company.com" who attempts to monitor the user's presence or contact the user will be denied access. The "nasty company.com setting takes precedence over the "ALL" setting, and, as a result, a more restrictive access policy is applied to "nasty company.com" than to other groups of users.

Referring to FIG. 11, an example of how the first client computer 304 (from FIG. 9) obtains updates to its access control configuration settings is shown. In this example, the client computer 304 is assumed to have previously subscribed to (using a SIP SUBSCRIBE message) to an "event" that is triggered whenever the user's existing access control list changes. The real-time communication server 308 monitors the management database 312, and upon detecting the presence of a new access control list for the user, transmits a document 354 containing a block of XML text that has the additions, deletions and/or modifications to the user's access control configuration settings. As shown in the example, a new access control configuration setting has been added to control the ability of "somecompany.com" to access the user, while the group "ntdev" has had its access control configuration settings changed for this user. Furthermore, "nasty company.com" has had its configuration setting deleted, so that "nasty company.com" has access to the use in accordance with the default configuration settings. Finally, the user access control configuration settings have no additions or deletions—just a modification to allow "Roberbr" to detect the user's presence and to call the user It can thus be seen that a new a useful method and configuring a computer for real-time communication has been provided. In view of the many possible embodiments to which the principles of this invention may be applied, it should be recognized that the embodiments described herein with respect to the drawing figures is meant to be illustrative only and should not be taken as limiting the scope of invention. For example, those of skill in the art will recognize that the elements of the illustrated embodiments shown in software may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A method for ensuring that a client computer on a computer network is properly configured for real-time communication, the method comprising:
receiving, from the client computer, a request to be notified when network conditions require a change in configuration settings of the client computer, wherein the configuration settings of the client computer allow the client computer to engage in real-time communication over the computer network, the configuration settings including an identification of a real-time communication server through which the client computer is to engage in real-time communication and an identification of a communication protocol for communicating with the real-time communication server;
monitoring conditions on the computer network to detect network conditions of network devices other than the client computer that require a possible change in the configuration settings of the client computer; and
when a network condition that requires a change in the configuration settings of the client computer is detected,
generating new configuration settings for transmission to the client computer without the need for the client computer to initiate the transmission; and
transmitting the new configuration settings to the client computer so that the client computer can update its configuration settings with the new configuration settings to engage in real-time communication over the computer network with the detected network conditions and so that the new configuration settings are automatically transmitted to the client computer without the need for the client computer to initiate the transmission.

2. A computer storage medium having stored thereon computer executable instructions for performing the method of claim 1.

3. The method of claim 1 wherein the receiving step comprises:
receiving a subscribe message formatted according to a session initiation protocol;
wherein the subscribe message identifies the user that is operating the client computer and
wherein the message includes a request for that user's profile and
wherein the profile indicates how the computer should be conducting real-time communication over the network.

4. The method of claim 1, wherein monitoring the network includes monitoring a database comprising configuration settings for allowing computers on the computer network to conduct real-time communication, wherein the database is distinct from the client computer.

5. The method of claim 1, wherein the configuration settings include the network address of the server computer that the client computer needs to contact in order to set up a real-time communication session.

6. The method of claim 1, wherein the transmitting step comprises:
inserting the new configuration settings into a message formatted according to a session initiation protocol; and
transmitting the message to the client computer.

7. The method of claim 6, wherein the inserting step comprises inserting into the message a block of mark-up language text that includes the new configuration setting.

8. The method of claim 1, wherein the client computer is currently configured for real-time communication according to a set of old configuration settings, and wherein the transmitting step comprises transmitting to the client computer changes that are to be made to the old configuration settings in order to derive the new configuration settings.

9. A system for facilitating real-time communication in a computer network, the system comprising:
a client computer executing one or more programs for performing steps comprising engaging in real-time communication on the computer network;
at least one computer storage medium having stored thereon a database, the database comprising configuration settings for allowing computers on the computer network to conduct real-time communication, wherein the database is distinct from the client computer, the configuration settings including an identification of a real-time communication server through which the client computer is to engage in real-time communication and an identification of a communication protocol for communicating with the real-time communication server;
a server computer communicatively linked to the client computer, the computer storage medium being accessible by the server computer, the server computer executing one or more programs for performing steps comprising monitoring conditions on the computer network to detect network conditions of network devices other than the client computer that require a possible change in the configuration settings of the client computer;
when a network condition that requires a change in the configuration settings of the client computer is detected, generating new configuration settings for transmission to the client computer without the need for the client computer to initiate the transmission; and
in response to the detecting step, transmitting the new configuration setting to the client computer over the computer network, so that the client computer can update its configuration settings with the new configuration settings to engage in real-time communication over the computer network with the detected network conditions and so that the new configuration settings are automatically transmitted to the client computer without the need for the client computer to initiate the transmission.

10. The system of claim 9, wherein the database is part of a directory service having information as to the layout of the network, and wherein the configuration settings are based at least in part of the layout of the network.

11. The system of claim 9, wherein the one or more programs executing on the client computer perform further steps comprising transmitting a request for the latest version of the configuration settings to the server computer.

12. The system of claim 9, wherein the configuration settings include the network address of a server that the one or more programs executing on the client should use to engage in real-time communication on the network.

13. The system of claim 9, wherein the one or more programs executing on the server computer perform further steps comprising:
generating a message formatted according to a session initiation protocol: and including the new configuration setting within the message, and
wherein the transmitting step comprises transmitting the message to the client computer.

14. The system of claim 9, wherein the one or more programs executing on the client computer perform further steps comprising:

generating a message formatted according to a session initiation protocol;

inserting a request to obtain the new configuration setting into the message; and transmitting the message to the server computer.

15. A system for configuring a computer for real-time communication on a computer network, the system comprising a means for generating, for transmission from a client computer to a server computer, a request that the client computer be updated whenever network conditions require a change in configuration settings of the client computer, wherein the configuration settings of the client computer allow the client computer to engage in real-time communication over the computer network;

a means for monitoring conditions on the network to detect network conditions of network devices other than the client computer that require a possible change in the configuration settings of the client computer;

a means for generating new configuration settings for transmission to the client computer without the need for the client computer to initiate the transmission when a network condition that requires a change in the configuration settings of the client computer is detected, the changed configuration settings providing information on how to engage in real-time communication with a real-time communication server as a result of the detected change in conditions of the network; and a means for generating for transmission from the server computer to the client computer, the new configuration settings as part of a protocol normally used by both the server computer and the client computer to structure real-time communication between the client computer and computers with which the client computer communicates so that the client computer can update its configuration settings with the new configuration settings to engage in real-time communication over the computer network with the detected network conditions and so that the new configuration settings are automatically transmitted to the client computer without the need for the client computer to initiate the transmission.

16. The system of claim 15, wherein the new configuration settings include a configuration document that contains a list of users and an indication of the extent to which each of the users and groups of users is permitted to monitor the presence of the user of the client computer.

17. The system of claim 15, wherein the new configuration settings include a configuration document that contains a list of other users and groups of users and an indication of the extent to which each of the users and groups of users is permitted contact, via real time communication, the user of the client computer.

18. The system of claim 15, further comprising:

a server computer executing one or more programs performing steps comprising:

communicating with the client computer according to a session initiation protocol; and transmitting to the client computer, the configuration document as part of a message formatted according to the session initiation protocol.

19. The system of claim 15, further comprising:

a server computer executing one or more programs for performing steps comprising:

receiving a first message from the client computer, the message including the identity of a user of the client computer;

retrieving information as to the extent to which individuals or groups of individuals are permitted to monitor the presence of the user on the computer network and to contact the user via real-time communication;

transmitting the information to the client computer in the form of mark-up language text as part of a second message formatted according to a session initiation protocol;

wherein the one or more program executed by the client computer perform further steps comprising:

transmitting the first message to the server computer in the form of a session initiation protocol message.

* * * * *